(12) United States Patent
Praisner et al.

(10) Patent No.: US 8,915,090 B2
(45) Date of Patent: *Dec. 23, 2014

(54) GAS TURBINE ENGINE MID TURBINE FRAME WITH FLOW TURNING FEATURES

(71) Applicant: United Technologies Corporation, Hartford, CT (US)

(72) Inventors: Thomas J. Praisner, Colchester, CT (US); Shankar S. Magge, South Windsor, CT (US); Matthew B. Estes, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,450

(22) Filed: Mar. 21, 2014

(65) Prior Publication Data

US 2014/0202133 A1    Jul. 24, 2014

Related U.S. Application Data

(63) Continuation of application No. PCT/US2012/063837, filed on Nov. 7, 2012.

(60) Provisional application No. 61/593,162, filed on Jan. 31, 2012.

(51) Int. Cl.
| | |
|---|---|
| *F02D 1/00* | (2006.01) |
| *F01D 9/04* | (2006.01) |
| *F01D 25/28* | (2006.01) |
| *F02K 3/06* | (2006.01) |

(52) U.S. Cl.
CPC ..... *F01D 9/041* (2013.01); *F01D 9/04* (2013.01); *F01D 25/28* (2013.01); *F02K 3/06* (2013.01)
USPC .............................. 60/796; 415/191

(58) Field of Classification Search
CPC ....... F02C 7/20; Y02T 50/671; Y02T 50/673; Y02T 50/676; F05D 2240/12
USPC .................... 60/226.1, 796; 415/191
See application file for complete search history.

(56) References Cited

U.S. PATENT DOCUMENTS

| | | |
|---|---|---|
| 3,475,107 A | 10/1969 | Auxier |
| 4,722,184 A | 2/1988 | Chaplin et al. |

(Continued)

OTHER PUBLICATIONS

Gunston, Bill, "Jane's Aero-Engines," Issue Seven, 2000, pp. 510-512.

(Continued)

*Primary Examiner* — Phutthiwat Wongwian
*Assistant Examiner* — Marionelie Frazer-Vicenty
(74) *Attorney, Agent, or Firm* — Carlson, Gaskey & Olds, P.C.

(57) ABSTRACT

A gas turbine engine includes first and second stages having a rotational axis. A circumferential array of airfoils is arranged axially between the first stage and the second stage. At least one of the airfoils have a curvature provided equidistantly between pressure and suction sides. The airfoils extend from a leading edge to a trailing edge at a midspan plane along the airfoil. An angle is defined between first and second lines respectively tangent to the intersection of the midspan plane and the curvature at airfoil leading and trailing edges. The angle is equal to or greater than about 10°.

28 Claims, 3 Drawing Sheets

(56) References Cited

U.S. PATENT DOCUMENTS

| | | | |
|---|---|---|---|
| 4,765,751 | A | 8/1988 | Pannone et al. |
| 5,894,721 | A | 4/1999 | Hanson |
| 6,234,754 | B1 | 5/2001 | Zelesky et al. |
| 6,254,333 | B1 | 7/2001 | Merry |
| 6,312,219 | B1 | 11/2001 | Wood et al. |
| 6,375,419 | B1 | 4/2002 | LeJambre et al. |
| 6,755,612 | B2 | 6/2004 | Shahpar et al. |
| 7,094,027 | B2 | 8/2006 | Turner et al. |
| 7,510,371 | B2 | 3/2009 | Orlando et al. |
| 7,611,326 | B2 | 11/2009 | Trindade et al. |
| 7,648,334 | B2 | 1/2010 | Hurst et al. |
| 7,694,505 | B2 | 4/2010 | Schilling |
| 7,722,329 | B2 | 5/2010 | Clarke |
| 7,850,428 | B2 | 12/2010 | Tibbott et al. |
| 7,934,900 | B1 | 5/2011 | Pask |
| 8,061,969 | B2 | 11/2011 | Durocher et al. |
| 8,075,259 | B2 | 12/2011 | Praisner et al. |
| 2008/0056896 | A1 | 3/2008 | Trindade et al. |
| 2010/0135770 | A1 | 6/2010 | Durocher et al. |
| 2010/0209238 | A1* | 8/2010 | Praisner et al. ............ 415/208.2 |
| 2010/0254797 | A1* | 10/2010 | Grover et al. ..................... 415/1 |
| 2011/0081228 | A1* | 4/2011 | Durocher et al. ............. 415/115 |
| 2012/0198817 | A1* | 8/2012 | Suciu et al. .................. 60/226.3 |

OTHER PUBLICATIONS

PCT International Search Report & Written Opinion for International Application No. PCT/US12/63837 completed Jun. 5, 2013.
International Preliminary Report on Patentability for PCT/US2012/063837. Date of issuance Aug. 5, 2014.

\* cited by examiner

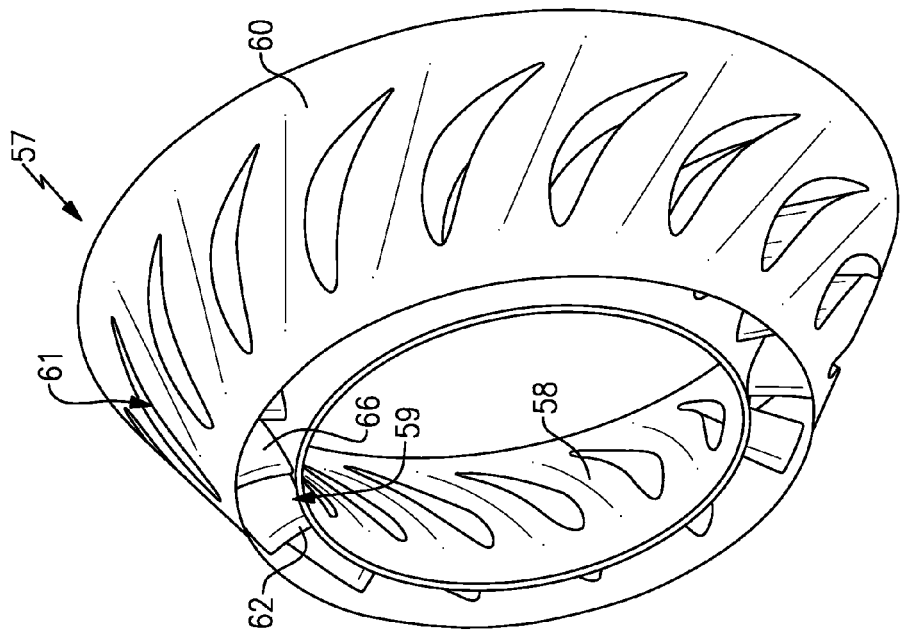
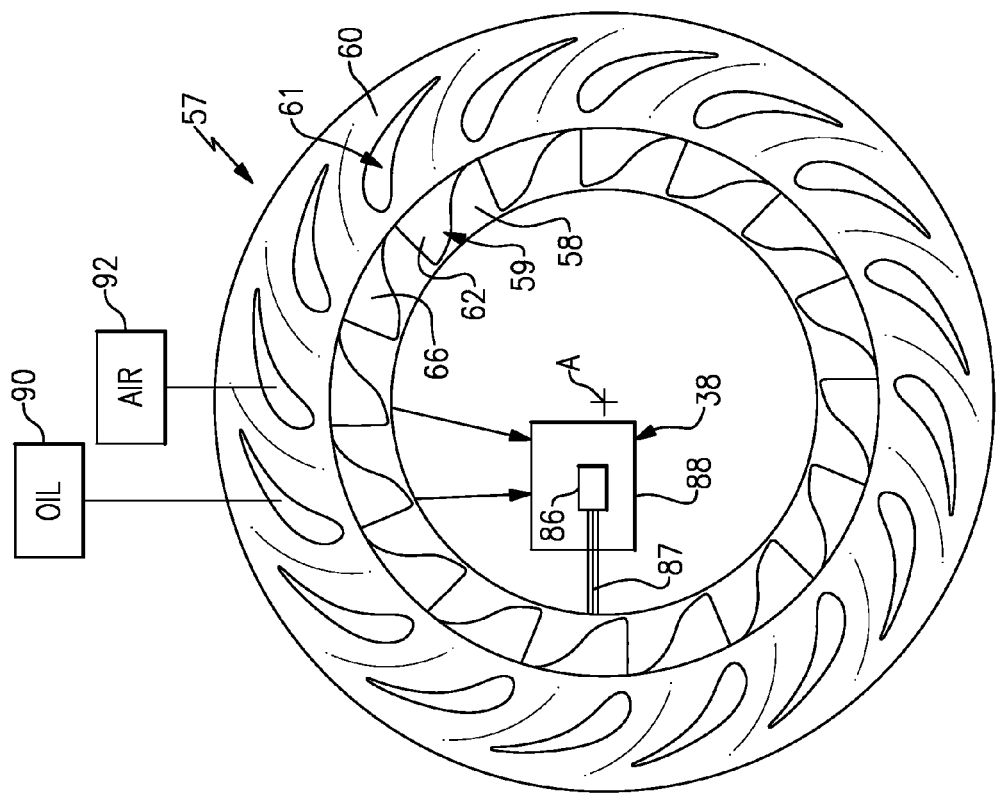

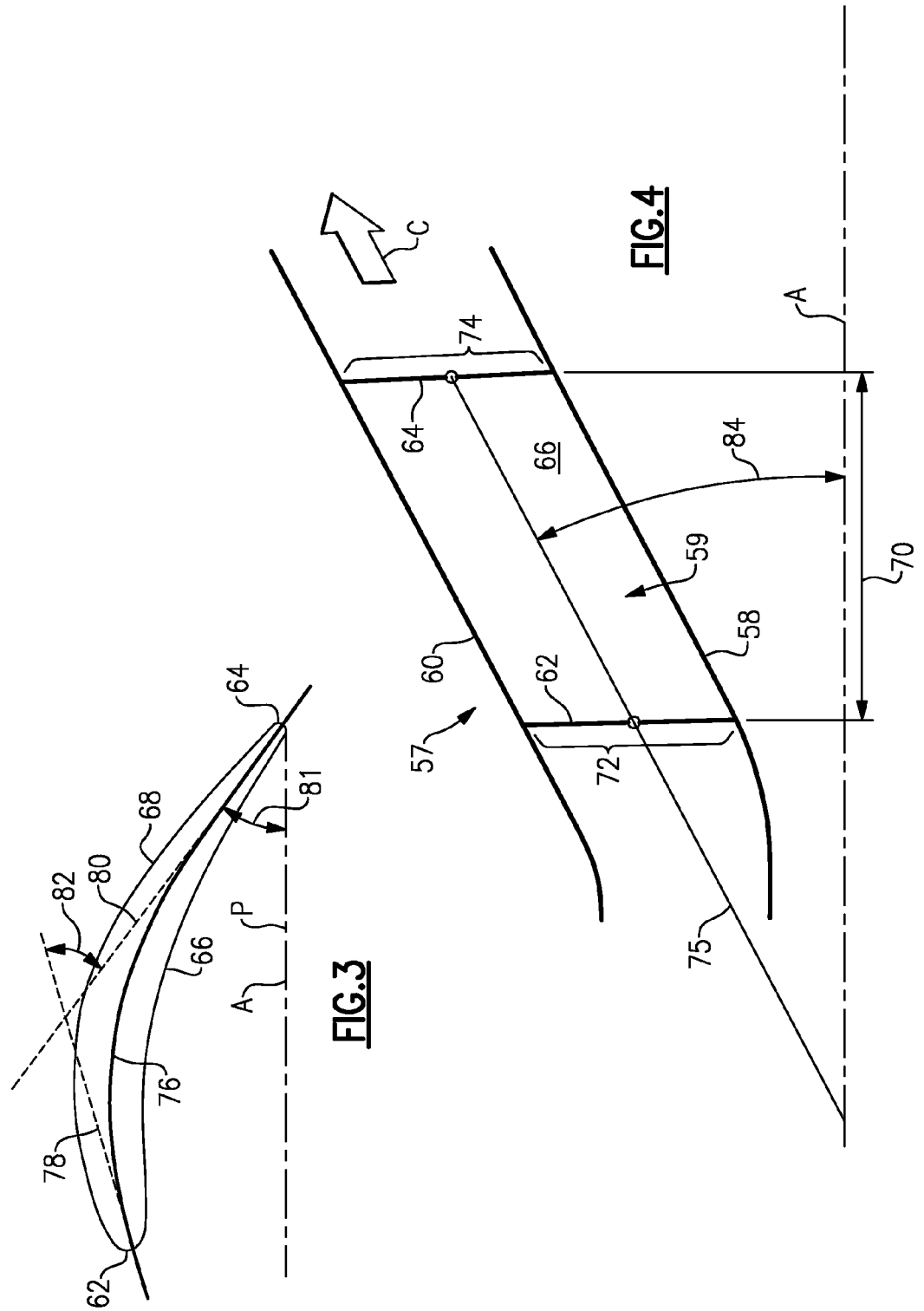

GAS TURBINE ENGINE MID TURBINE FRAME WITH FLOW TURNING FEATURES

This application is a continuation of International Application No.: PCT/US2012/063837, filed on Nov. 7, 2012, which claims priority to U.S. Provisional Application No. 61/593,162, which was filed on Jan. 31, 2012.

BACKGROUND

This disclosure relates to a gas turbine engine mid turbine frame with flow turning features.

One typical gas turbine engine includes multiple, nested coaxial spools. A low pressure turbine is mounted to a first spool, and a high pressure turbine is mounted to a second spool. A mid turbine frame is arranged axially between the low pressure turbine and the high pressure turbine. One example mid turbine frame includes first and second circumferential arrays of turbine vanes adjoining radially spaced outer and inner cases. The first and second array of vanes are axially spaced from one another. Oil and air may be passed through the airfoils.

SUMMARY

A gas turbine engine according to an exemplary embodiment of this disclosure, among other possible things includes a turbine section. A circumferential array of stationary airfoils are arranged within the turbine section with at least one of the airfoils having a curvature provided equidistantly between pressure and suction sides and extending from a leading edge to a trailing edge at a midspan plane along the airfoil. An angle is defined between first and second lines respectively tangent to the intersection of the midspan plane and the curvature at the airfoil leading and trailing edges. The angle being equal to or greater than about 10°.

In a further embodiment of any of the foregoing gas turbine engines, the midspan plane is oriented at a flow path angle relative to the rotational axis in a range of about 20° to about 60°.

In a further embodiment of any of the foregoing gas turbine engines, includes an inner case and an outer case joined by the airfoils. The leading and trailing edges respectively extending in a generally radial direction from the inner case and the outer case. The airfoils extend in an axial direction an axial chord length between the leading and trailing edges. The at least one of airfoils having an aspect ratio of less than 1.5. The aspect ratio is an average of the sum of the leading and trailing edge spans divided by the axial chord length.

In a further embodiment of any of the foregoing gas turbine engines, a rotational axis plane extends through the rotational axis and intersects the trailing edge and the curvature, a first angle provided between the rotational axis plane and the second line is greater than about 20°.

In a further embodiment of any of the foregoing gas turbine engines, the array includes twenty or fewer airfoils.

In a further embodiment of any of the foregoing gas turbine engines, the array of stationary airfoils are supported between an inner case and an outer case.

In a further embodiment of any of the foregoing gas turbine engines, at least one of the array of stationary airfoils defines a cavity through which a support structure for a bearing structure extends.

In a further embodiment of any of the foregoing gas turbine engines, at least one of the array of stationary airfoils defines a cavity through which a fluid is communicated between the outer case and the inner case.

In a further embodiment of any of the foregoing gas turbine engines, includes a compressor section including a first compressor and a second compressor. A combustor is in communication with the compressor section. The turbine section is in communication with the combustor section. The turbine section includes a first turbine and a second turbine and the circumferential array of airfoils is positioned between the first turbine and the second turbine.

In a further embodiment of any of the foregoing gas turbine engines, further includes a fan driven by the turbine section.

In a further embodiment of any of the foregoing gas turbine engines, includes a geared architecture configured to drive the fan. One of the first turbine and the second turbine is configured to drive the geared architecture.

In a further embodiment of any of the foregoing gas turbine engines, the geared architecture is configured to provide a speed reduction greater than about 2.5:1.

In a further embodiment of any of the foregoing gas turbine engines, the geared architecture includes an epicyclic gear train.

In a further embodiment of any of the foregoing gas turbine engines, the epicyclic gear train includes a planetary gear system.

In a further embodiment of any of the foregoing gas turbine engines, the gas turbine engine is a high bypass geared aircraft engine having a bypass ratio of greater than about six (6).

In a further embodiment of any of the foregoing gas turbine engines, the bypass ratio is greater than about ten (10).

In a further embodiment of any of the foregoing gas turbine engines, the gas turbine engine includes a Fan Pressure Ratio of less than about 1.45.

In a further embodiment of any of the foregoing gas turbine engines, a fan tip speed is less than about 1150 ft/second.

In a further embodiment of any of the foregoing gas turbine engines, the second turbine is configured to drive the geared architecture and has a pressure ratio that is greater than about 5.

In a further embodiment of any of the foregoing gas turbine engines, the first turbine rotates in a direction opposite the second turbine.

A turbine module for gas turbine engine according to an exemplary embodiment of this disclosure, among other possible things includes a circumferential array of stationary airfoils with at least one of the airfoils having a curvature provided equidistantly between pressure and suction sides and extending from a leading edge to a trailing edge at a midspan plane along the airfoil, and an angle defined between first and second lines respectively tangent to the intersection of the midspan plane and the curvature at the airfoil leading and trailing edges, the angle being equal to or greater than about 10°.

In a further embodiment of any of the foregoing turbine modules, the midspan plane is oriented at a flow path angle relative to the rotational axis in a range of about 20° to about 60°.

In a further embodiment of any of the foregoing turbine modules, includes an inner case and an outer case joined by the airfoils. The leading and trailing edges respectively extending in a generally radial direction from the inner case and from the outer case. The airfoils extend in an axial direction an axial chord length between the leading and trailing edges. The at least one of the airfoils having an aspect ratio of less than 1.5. The aspect ratio is an average of the sum of the leading and trailing edge spans divided by the axial chord length.

In a further embodiment of any of the foregoing turbine modules, a rotational axis plane extends through the rotational axis and intersects the trailing edge and the curvature, a first angle provided between the rotational axis plane and the second line is greater than about 20°.

In a further embodiment of any of the foregoing turbine modules, the array of stationary airfoils are supported between an inner case and an outer case.

A method of designing a gas turbine engine according to an exemplary embodiment of this disclosure, among other possible things includes defining a turbine section to include a circumferential array of stationary airfoils arranged with at least one of the airfoils having a curvature provided equidistantly between pressure and suction sides and extending from a leading edge to a trailing edge at a midspan plane along the airfoil. An angle is defined between first and second lines respectively tangent to the intersection of the midspan plane and the curvature at the airfoil leading and trailing edges, the angle being equal to or greater than about 10°.

In a further embodiment of any of the foregoing methods, includes defining the midspan plane to be oriented at a flow path angle relative to the rotational axis in a range of about 20° to about 60°.

In a further embodiment of any of the foregoing methods, includes defining an inner case and an outer case joined by the airfoils such that the leading and trailing edges respectively extend in a generally radial direction from the inner case and from the outer case. The airfoils extend in an axial direction an axial chord length between the leading and trailing edges, and configuring at least one of the airfoils to include an aspect ratio of less than 1.5. The aspect ratio is an average of the sum of the leading and trailing edge spans divided by the axial chord length.

In a further embodiment of any of the foregoing methods, includes defining a compressor section to include a first compressor and a second compressor, configuring a combustor to be in communication with the compressor section and the turbine section to be in communication with the combustor section, and configuring the turbine section to include at least a first turbine and a second turbine.

In a further embodiment of any of the foregoing methods, includes configuring a geared architecture to drive a fan and one of the first turbine and the second turbine to drive the geared architecture.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The disclosure can be further understood by reference to the following detailed description when considered in connection with the accompanying drawings wherein:

FIG. 2A is a front elevational view of an example mid turbine frame schematically depicting a bearing and oil and air sources.

FIG. 2B is a side perspective view of the mid turbine frame illustrated in FIG. 2A.

FIG. 3 is a cross-sectional view through a midspan plane of an airfoil shown in FIG. 4.

FIG. 4 is a schematic side view of an airfoil in the mid turbine frame.

DETAILED DESCRIPTION

Figure 1:
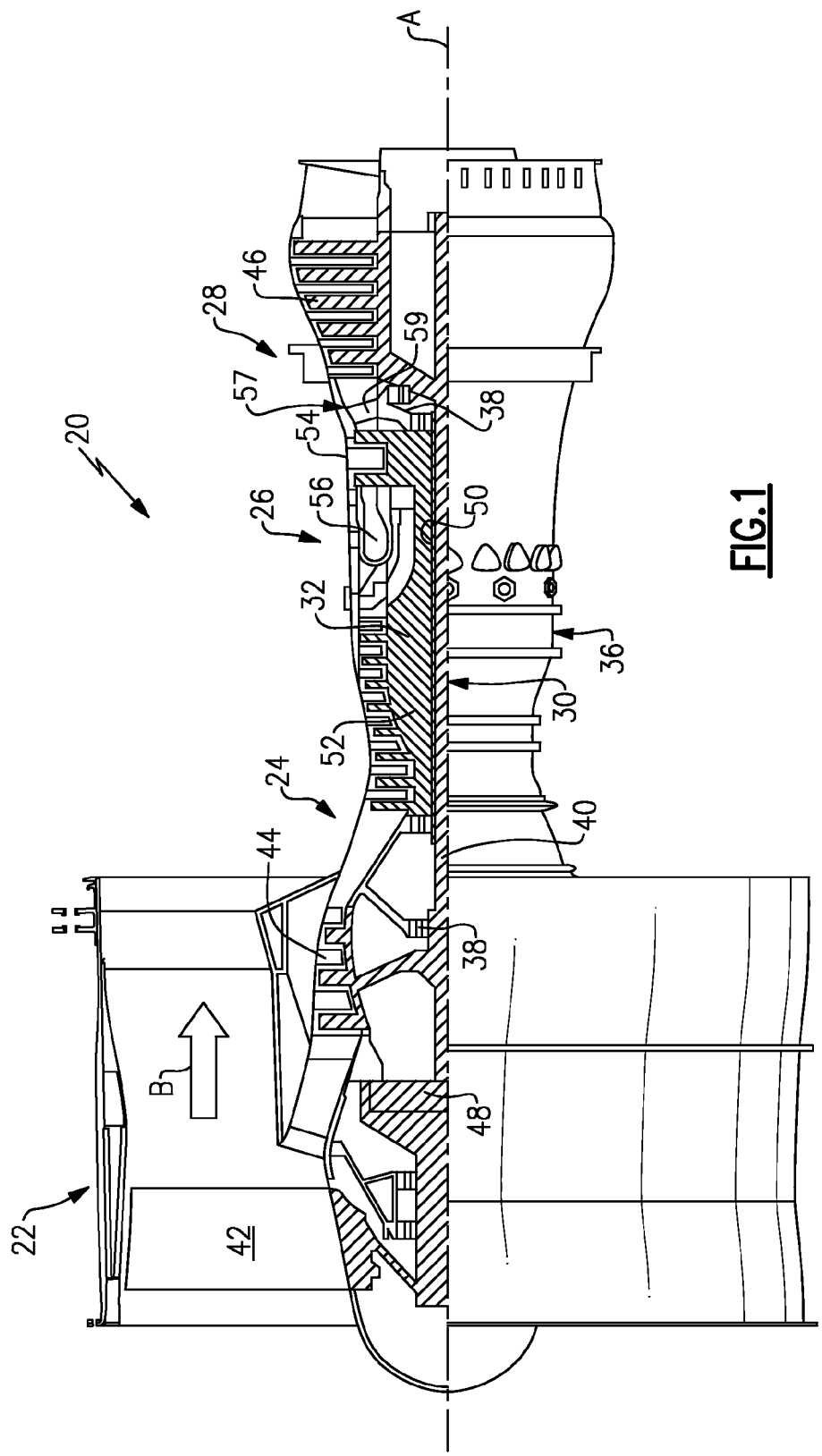
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation in opposite direction relative to one another about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 directly or through a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54, the mid-turbine frame 57, and low pressure turbine 46. The mid-turbine frame 57 includes circumferential array of airfoils 59, which are arranged in the core airflow path axially between the low and high pressure turbines 46, 54. In one example, there are twenty or fewer airfoils arranged in a single axial row circumferentially along the mid turbine frame flow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned per hour divided by 1 bf of thrust the engine produces at that minimum point. "Fan pressure ratio" is the pressure ratio across the fan blade alone, without a Fan Exit Guide Vane ("FEGV") system. The fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed," as disclosed herein according to one non-limiting embodiment, is less than about 1150 ft/second.

Referring to FIGS. 2A and 2B, the mid turbine frame 57 includes inner and outer cases 58, 60 joined by the airfoils 59 to define a mid turbine frame flow path through which core airflow C passes. In one example, the airfoils 59 provide cavities 61 through which components and/or fluids may pass. For example, a structure support 87 may extend through the cavities 61 to support a bearing 86 arranged in a bearing compartment 88. The bearing 86 is part of a bearing system 38, which may support the high speed spool 32. An oil source 90 may communicate oil to the bearing compartment 88 through a cavity 88, and an air source 92 may supply air through a cavity 61 to buffer the bearing compartment 88.

Referring to FIGS. 3 and 4, with continuing reference to FIGS. 2A-2B, the airfoils 59 include circumferentially spaced pressure and suction sides 66, 68 extending somewhat axially between leading and trailing edges 62, 64. Each airfoil 59 has a curvature 76 provided equidistantly between pressure and suction sides 66, 68. The airfoils 59 extend from the leading edge 62 to the trailing edge 64 along a midspan plane 75. In one example, the midspan plane 75 is oriented at a flow path angle 84 relative to the rotational axis A in the range of 20°-60°

The airfoils 59 have a camber that induces a turning airflow as the air passes through the mid turbine frame 57 between the counter rotating first and second stages, such as high and low pressure turbines 54, 46. It should be understood that the airfoils 59 may also be used between other sets of rotating stages. A plane P extends through the rotational axis A and intersects the trailing edge 64 and curvature 76. First and second lines 78, 80 are respectively tangent to the curvature 76 at the leading and trailing edges 62, 64. A first angle 81 is provided between the plane P and the second line 80, and a second angle 82 is provided between the second and first lines 80, 78. In one example, the first angle 81 is in a range of 0°-70°, and the second angle 82 is greater than 10°. It should be understood that the first angle may have other values outside the range and still fall within the scope of this disclosure.

Referring to FIG. 4, the leading and trailing edges 62, 64 respectively extend in a generally radial direction from the inner and outer cases 58, 60. A leading edge span 72 and a trailing edge span 74. The airfoil 59 extends in an axial direction an axial chord length 70 between the leading and trailing edges 62, 64. The airfoils 59 each have an aspect ratio of less than 1.5, wherein the aspect ratio is an average of the sum of the leading and trailing edge spans 72, 74 divided by the axial chord length 70. In one example, the aspect ratio has a range of greater than 1.0 to about 1.5.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a turbine section disposed about a rotational axis; and
   a circumferential array of stationary airfoils arranged within the turbine section with at least one of the airfoils having a curvature provided equidistantly between pressure and suction sides and extending from a leading edge to a trailing edge at a midspan plane along the airfoil, and an angle defined between first and second lines respectively tangent to the curvature at the airfoil leading and trailing edges, the angle being equal to or greater than 10°, wherein a rotational axis plane extends through the rotational axis and intersects the trailing edge and the curvature with a first angle provided between the rotational axis plane and the second line that is greater than 20°.

2. The gas turbine engine according to claim 1, wherein the midspan plane is oriented at a flow path angle relative to the rotational axis between 20° and 60°.

3. The gas turbine engine according to claim 2, comprising an inner case and an outer case joined by the airfoils, the leading and trailing edges respectively extending in a generally radial direction from the inner case and the outer case, and the airfoils extend in an axial direction an axial chord length between the leading and trailing edges, the at least one of airfoils having an aspect ratio of less than 1.5, wherein the aspect ratio is an average of the sum of the leading and trailing edge spans divided by the axial chord length.

4. The gas turbine engine according to claim 1, wherein the array includes twenty or fewer airfoils.

5. The gas turbine engine according to claim 2, wherein the array of stationary airfoils are supported between an inner case and an outer case.

6. The gas turbine engine according to claim 5, wherein at least one of the array of stationary airfoils defines a cavity through which a support structure for a bearing structure extends.

7. The gas turbine engine according to claim 5, wherein at least one of the array of stationary airfoils defines a cavity through which a fluid is communicated between the outer case and the inner case.

8. The gas turbine engine according to claim 1, including
   a compressor section comprising a first compressor and a second compressor;
   a combustor in communication with the compressor section; wherein the turbine section is in communication with the combustor section, the turbine section including a first turbine and a second turbine and the circumferential array of airfoils is positioned between the first turbine and the second turbine.

9. The gas turbine engine according to claim 8, further comprising a fan driven by the turbine section.

10. The gas turbine engine according to claim 9, including a geared architecture configured to drive the fan, wherein one of the first turbine and the second turbine is configured to drive the geared architecture.

11. The gas turbine engine according to claim 10, wherein the geared architecture is configured to provide a speed reduction greater than 2.5:1.

12. The gas turbine engine according to claim 11, wherein the geared architecture comprises an epicyclic gear train.

13. The gas turbine engine according to claim 12, wherein the epicyclic gear train comprises a planetary gear system.

14. The gas turbine engine according to claim 10, wherein the gas turbine engine is a high bypass geared aircraft engine having a bypass ratio of greater than six (6).

15. The gas turbine engine according to claim 14, wherein the bypass ratio is greater than ten (10).

16. The gas turbine engine according to claim 14, wherein the gas turbine engine includes a Fan Pressure Ratio of less than 1.45.

17. The gas turbine engine according to claim 16, wherein a fan tip speed is less than 1150 ft/second.

18. The gas turbine engine according to claim 17, wherein the second turbine is configured to drive the geared architecture and has a pressure ratio that is greater than 5.

19. The gas turbine engine according to claim 18, wherein the first turbine rotates in a direction opposite the second turbine.

20. A turbine module for gas turbine engine comprising:
a circumferential array of stationary airfoils disposed about a rotational axis with at least one of the airfoils having a curvature provided equidistantly between pressure and suction sides and extending from a leading edge to a trailing edge at a midspan plane along the airfoil, and an angle defined between first and second lines respectively tangent to the curvature at the airfoil leading and trailing edges, the angle being equal to or greater than 10°, wherein a rotational axis plane extends through the rotational axis and intersects the trailing edge and the curvature and a first angle provided between the rotational axis plane and the second line is greater than 20°.

21. The turbine module as recited in claim 20, wherein the midspan plane is oriented at a flow path angle relative to the rotational axis in a range between 20° and 60°.

22. The turbine module as recited in claim 21, comprising an inner case and an outer case joined by the airfoils, the leading and trailing edges respectively extending in a generally radial direction from the inner case and from the outer case, and the airfoils extend in an axial direction an axial chord length between the leading and trailing edges, the at least one of the airfoils having an aspect ratio of less than 1.5, wherein the aspect ratio is an average of the sum of the leading and trailing edge spans divided by the axial chord length.

23. The turbine module as recited in claim 20, wherein the array of stationary airfoils are supported between an inner case and an outer case.

24. A method of designing a gas turbine engine comprising:
defining a turbine section about a rotational axis to include a circumferential array of stationary airfoils arranged with at least one of the airfoils having a curvature provided equidistantly between pressure and suction sides and extending from a leading edge to a trailing edge at a midspan plane along the airfoil, and an angle defined between first and second lines respectively tangent to the curvature at the airfoil leading and trailing edges, the angle being equal to or greater than 10°, wherein a rotational axis plane extends through the rotational axis and intersects the trailing edge and curvature with a first angle provided between the rotational axis plane and the second line that is greater than 20°.

25. The method as recited in claim 24, including defining the midspan plane to be oriented at a flow path angle relative to the rotational axis in a range between 20° and 60°.

26. The method as recited in claim 25, including defining an inner case and an outer case joined by the airfoils such that the leading and trailing edges respectively extend in a generally radial direction from the inner case and from the outer case, and the airfoils extend in an axial direction an axial chord length between the leading and trailing edges, and configuring at least one of the airfoils to include an aspect ratio of less than 1.5, wherein the aspect ratio is an average of the sum of the leading and trailing edge spans divided by the axial chord length.

27. The method as recited in claim 24, including defining a compressor section to include a first compressor and a second compressor;
configuring a combustor to be in communication with the compressor section and the turbine section to be in communication with the combustor section; and configuring the turbine section to include at least a first turbine and a second turbine.

28. The method as recited in claim 27, including configuring a geared architecture to drive a fan and one of the first turbine and the second turbine to drive the geared architecture.

* * * * *